G. EASON.
Bee Hive.
No. 82,298.
Patented Sept. 22, 1868.
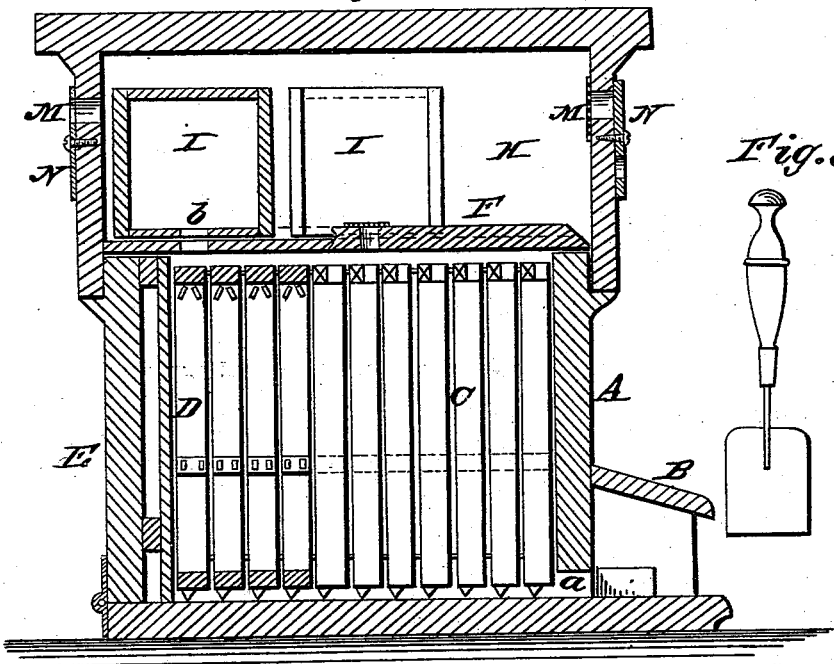
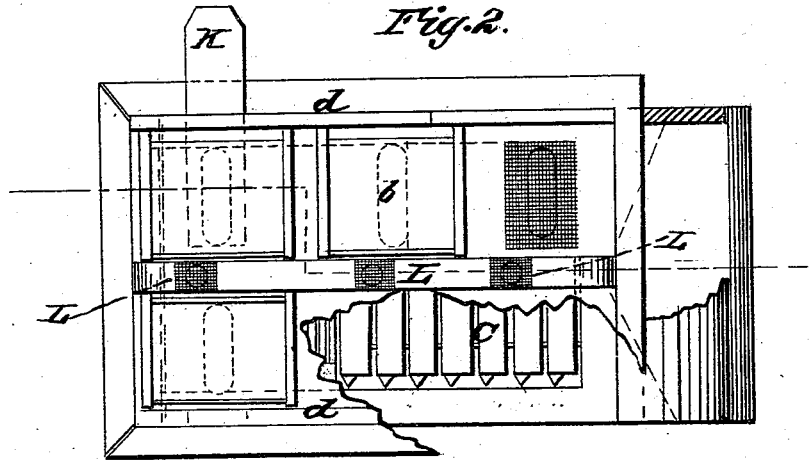

United States Patent Office.

GEORGE EASON, OF LYONS, NEW YORK.

Letters Patent No. 82,298, dated September 22, 1868.

IMPROVEMENT IN BEE-HIVES.

*The Schedule referred to in these Letters Patent and making part of the same.*

TO ALL WHOM IT MAY CONCERN:

Be it known that I, GEORGE EASON, of Lyons, in the county of Wayne, and State of New York, have invented a new and improved Bee-Hive; and I do hereby declare that the following is a full, clear, and exact description thereof, which will enable those skilled in the art to make and use the same, reference being had to the accompanying drawings, forming part of this specification.

The object of this invention is to provide an improved bee-hive.

It consists of the hereinafter-described arrangements of the several parts, which will be fully described on reference to the accompanying drawings, wherein—

Figure 1 represents a sectional elevation, taken on the line $x$ $x$ of fig. 2, and Figure 2 represents a plan with the cover removed and a part broken away.

Figure 3 represents an implement for removing the honey-boxes.

Similar letters of reference indicate corresponding parts.

A represents the body of the hive, provided with the opening $a$, for the passage of the bees, over which a porch, B, is erected, for protection against the weather.

The interior of the part A is provided with the comb-frames C and the division-board D, where it is designed that the bees shall deposit that portion of the honey upon which they subsist, and the breeding-cells.

The object of the division-board is to regulate the capacity of the part $a$ to the size of that of the family.

The comb-frames may be taken out from time to time to clean off the old comb as it becomes foul, the swinging door E being provided for that purpose; also to facilitate the hiving of detaching colonies by opening it and setting adjacent thereto another hive, wherein one or more of the comb-frames C may be placed, to which the separating colony will naturally take.

Above the honey-board F is arranged the honey-chamber H, where the boxes I are arranged for securing the box-honey, to which passages $b$ for the bees are made through the honey-board and through the bottom of the said boxes.

K represents slides, which may be entered through ribs on the edges of the honey-board, for the purpose of closing communication with the said boxes through the passages $b$, or with the chamber H, when it is desired to remove the said boxes.

L represents ventilating-passages through the honey-board into the chamber H, and M represents ventilating-passages through the side walls of the said chamber, which may, when desired, be closed by the valves N.

In the cold weather, when it would expose the bees too much to the effects of the same to allow the circulation of air throughout the hive, as will be the case when the passages L are open, they may be closed, and one of the passages $b$, next to the side where the opening $a$ is, may be used for ventilation, it being covered by wire gauze, whereby the draught through the hive will be directly upward, and will not materially affect the bees, which may be out of the way of the same, while it will equally serve to carry off the moisture imparted to the air by them.

I claim as new, and desire to secure by Letters Patent—

1. The box A, provided with the porch B, swinging side E, comb-frames C, and division-board D, all as and for the purpose set forth.

2. The arrangement of the ventilating-passages N, L, and $b$, the latter being covered with a wire screen, as and for the purpose described.

GEORGE EASON.

Witnesses:
GEORGE W. ELLSWORTH,
E. A. GRISWOLD.